United States Patent
Sun (10) Patent No.: US 7,321,626 B2
(45) Date of Patent: Jan. 22, 2008

(54) SYSTEM AND METHOD FOR PREDICTIVE MOTION ESTIMATION USING A GLOBAL MOTION PREDICTOR

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 785 days.

(21) Appl. No.: 10/672,820

(22) Filed: Sep. 26, 2003

(65) Prior Publication Data
US 2004/0057520 A1    Mar. 25, 2004

Related U.S. Application Data

(63) Continuation-in-part of application No. 10/094,043, filed on Mar. 8, 2002, now Pat. No. 7,227,896.

(51) Int. Cl.
*H04N 7/12* (2006.01)
*G06K 9/36* (2006.01)

(52) U.S. Cl. .................. 375/240.16; 382/236
(58) Field of Classification Search ........... 375/240.16, 375/240.02, 240.2, 240.25, 240.12; 382/238, 382/236
See application file for complete search history.

(56) References Cited

U.S. PATENT DOCUMENTS

| | | | |
|---|---|---|---|
| 5,745,183 A | 4/1998 | Lam | 348/416 |
| 5,818,969 A | 10/1998 | Astle | 382/236 |
| 6,122,320 A | 9/2000 | Bellifemine et al. | 375/240 |
| 6,195,389 B1 | 2/2001 | Rodriguez et al. | 375/240.16 |
| 2003/0202591 A1* | 10/2003 | Panusopone | 375/240.16 |
| 2006/0067404 A1* | 3/2006 | Monro et al. | 375/240.12 |

* cited by examiner

*Primary Examiner*—Gims Philippe
(74) *Attorney, Agent, or Firm*—Law Office of Gerald Maliszewski; Gerald Maliszewski (57) ABSTRACT

A system and method are provided for using global motion predictors (GMPs) in predictive motion estimation for the compression of video. The method comprises: receiving video frames; generating a set of global motion parameters for a current frame of video; in response to the global motion parameters, generating GMPs for image blocks in the current frame; estimating motion between the current frame and a reference frame; subtracting reference blocks in the reference frame from image blocks in the current frame, leaving residual image blocks; and, encoding the residual image blocks in a video stream. Some aspects of the method further comprise: generating local motion predictors (LMPs). Then, estimating motion between the current frame and a reference frame includes estimating motion using the GMPs and the LMPs. The process of estimating motion typically involves using previously encoded information, such as temporarily distant reference frames or other image blocks in the current frame.

31 Claims, 4 Drawing Sheets

SYSTEM AND METHOD FOR PREDICTIVE MOTION ESTIMATION USING A GLOBAL MOTION PREDICTOR

RELATED APPLICATIONS

This application is a continuation-in-part of a patent application entitled, METHOD AND APPARATUS FOR GLOBAL MOTION ESTIMATION, invented by Shijun Sun, Ser. No. 10/094,043, filed Mar. 8, 2002 now U.S. Pat. No. 7,227,896.

BACKGROUND OF THE INVENTION

1. Field of the Invention

This invention generally relates to digital image compression and, more particularly, to a system and method for using a global motion predictor (GMP) to reduce the computations associated with encoding video frames, and to improve video encoding quality.

2. Description of the Related Art

Motion estimation is the main bottleneck in most conventional video-encoding systems. Therefore, many fast motion estimation methods have been developed for real-time video encoding. Predictive motion estimation techniques have become widely accepted due to their low complexity, as compared to the brute force full search method, and they have better performance than other fast motion search methods. The efficiency of the predictive motion search methods comes from the continuity of the motion vector fields. Typically, several highly likely motion vector candidates or predictors can be chosen from the immediately adjacent image blocks in the same frame, and from the corresponding image blocks in the neighboring frames in the temporal domain. One candidate is then selected from the predictors based on a certain measurement. A local search is performed around the best candidate to refine the final motion vector.

Motions in video images are typically either regarded as object motions (also called local motions) or camera motions (also called global motions). Most conventional predictive motion estimation algorithms focus mainly on the local motions, due to the consideration of the motion predictions from only the neighboring image blocks (either spatially or temporally).

It would be advantageous if global motion parameters could be used to simplify the motion estimates needed to encode (compress) video frames.

The global motion in an image sequence is usually considered as the relative motion of the camera with respect to the image background. There are a number of global motion modeling methods, which consider some or all of panning, zooming, rotation, affine motions, and perspective motions. Mathematically, these global operations can be described as different transform matrices. However, in the discrete digital image domain, it is usually computationally quite expensive to solve the global motion parameters strictly following the mathematical models, which are well defined for the continuous space.

Some techniques have been developed to conduct global motion estimation using a motion vector field obtained by a local motion estimation algorithm. Global motion parameters can then be derived based on the mathematical models. The complexity of local motion estimation is a computational barrier for practical usages. In another technique, hardware sensors are mounted within a video camera to catch the camera motion. The hardware implementation might be suitable for high-end video camera and coding systems, however, it is very costly for regular consumer electronics.

A difficulty in global motion estimation is the existence of independently moving objects that introduce bias to the estimated motion parameters. Many methods have been proposed in the past years to gain the efficiency and robustness for global motion estimation. One of the latest techniques uses video object masks to remove the moving objects in order to obtain higher robustness. The overhead needed to create video object segmentations is difficult to obtain in most video systems.

Another global motion estimation technique uses a truncated quadratic function to define the error criterion, in order to remove the image pixels of moving objects. This method significantly improves the robustness and efficiency. However, the truncation utilizes a pre-fixed threshold, which is not well defined.

One common aspect of the software-based global motion estimation methods mentioned above is that they derive their global motion parameters from a comparison of two temporally consecutive image frames, using the full content in the images. This is a computationally expensive process.

It would be advantageous if a computationally simple process could be used for deriving global motion predictors, from global motion parameters, that could be applied to the above-mentioned motion estimates.

SUMMARY OF THE INVENTION

The present invention describes a reliable global motion predictor (GMP) that is used to improve predictive motion estimation for video sequences involving fast camera motions.

Accordingly, a method is provided for using global motion predictors (GMPs) in predictive motion estimation for the compression of video. The method comprises: receiving video frames; generating a set of global motion parameters for a current frame of video; in response to the global motion parameters, generating GMPs for image blocks in the current frame; estimating motion between the current frame and a reference frame; subtracting reference blocks in the reference frame from image blocks in the current frame, leaving residual image blocks; and, encoding the residual image blocks in a video stream.

Some aspects of the method further comprise: generating local motion predictors (LMPs). Then, estimating motion between the current frame and a reference frame includes estimating motion using the GMPs and the LMPs. The process of estimating motion typically involves using previously encoded information, such as temporarily distant reference frames or other image blocks in the current frame.

When global motion parameters are generated with respect to a first reference frame, then estimating motion between the current frame and a reference frame includes scaling GMPs in response to the temporal difference between a first reference and the current frame. More particularly, the GMPs can involve the generation of a global motion vector ($V_{GM}$) with respect to a second reference frame, having a temporal difference $T_A$ from the current frame. Then, the GMPs are scaled as follows:

$$GMP = V_{GM} \cdot (T_B/T_A);$$

where $T_B$ is the temporal difference between the first reference frame and the current frame.

Additional details of the above-mentioned method, and a system for using GMPs in predictive motion estimation for the compression of video, are provided below.

DETAILED DESCRIPTION OF THE PREFERRED EMBODIMENTS

Figure 1:
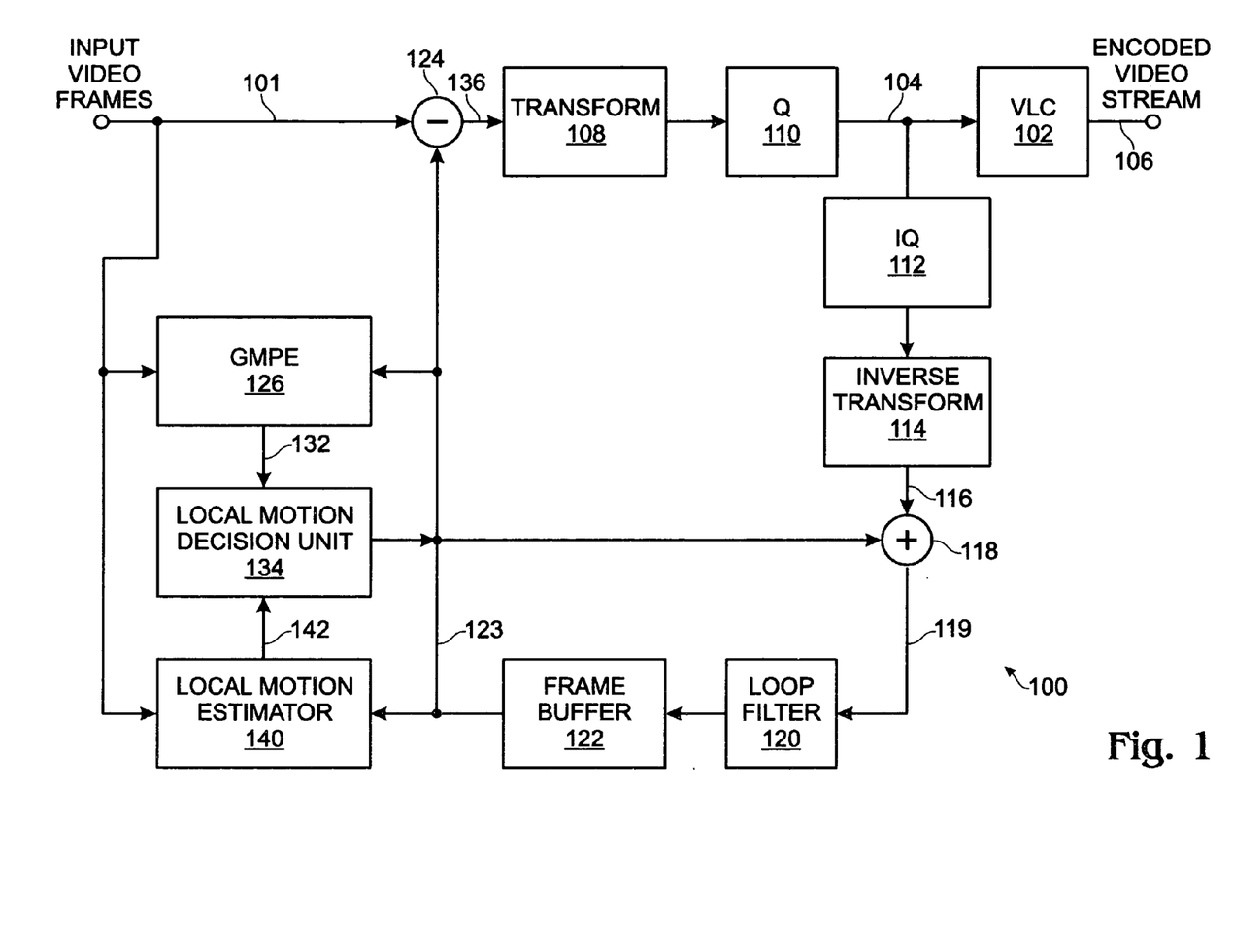
FIG. 1 is a schematic block diagram of the present invention system for using global motion predictors (GMPS) in predictive motion estimation for the compression of video.

FIG. 1 is a schematic block diagram of the present invention system for using global motion predictors (GMPS) in predictive motion estimation for the compression of video. The system 100 accepts video frames on line 101. A variable length coder 102 (VLC) has an interface on line 104 to receive transformed video frame residuals and an interface to supply an encoded video stream on line 106. A transformer is referenced with designator 108. The transformed video frames are quantized at quantizer 110 (Q), and supplied to the VLC 102.

In the feedback path (line 104), an inverse quantizer (IQ) 112 and inverse transformer 114 supply the input video frames on line 116. The video frames and added to a motion estimation, or motion prediction block, as represented by adder 118. The resultant signal on line 119 is loop filtered (120) and stored in a frame buffer 122. Reference frames from the frame buffer 122 are supplied on line 123 and used in motion estimations, as explained below. Reference frames from the frame buffer 122 are also subtracted from input video frames at summing circuit 124. All the above-mentioned elements should be understood to be conventional elements in a compressed video encoding system, such as MPEG-2 or MPEG-4 to name a couple of examples.

A global motion parameter estimator 126 (GMPE) has an interface on line 101 to accept a current video frame and an interface to accept a first reference frame. The GMPE 126 has an interface on line 132 to supply global motion parameters calculated in response to comparing the current frame to the first reference frame. A block motion decision unit 134 has an interface on line 134 to receive the global motion parameters. The block motion decision unit 134 calculates GMPs in response to comparing image blocks in the current frame to reference blocks in a second reference frame. For simplicity, it is assumed that the second reference frame is passed through the local motion estimator, from the frame buffer 122. The block motion decision unit supplies motion prediction blocks at an interface on line 123. The summing circuit 124 has an interface on line 101 to accept the current frame and an interface on line 123 to accept the motion prediction blocks. The summing circuit 124 has an interface on line 136 to supply residual image blocks for transforming and coding, as a result of subtracting the motion prediction blocks from image blocks in the current frame.

In some circumstances, such as when all the motion between frames can be describes as movement of perspective, or camera movement, only the GMPs are required to create the motion prediction blocks. In other circumstances, local motion predictors (LMPs) are also required. Then, the system 100 further comprises a local motion estimator 140 having an interface on line 101 to accept the current frame and an interface on line 123 to accept the second reference frame. The local motion estimator 140 supplies LMPs at an interface on line 142 in response to comparing image blocks in the current frame and reference blocks in the second reference frame. The block motion decision unit 134 has an interface on line 142 to accept the LMPs and supplies motion prediction blocks on line 123 in response to the GMPs and the LMPs.

In some aspects of the system, the GMPE 126 generates a set of global motion parameters for a current predictive (P) frame, considered with respect to a previously encoded frame. Likewise, the GMPE 126 may generate a set of global motion parameters for a current bidirectional (B) frame, considered with respect to previous encoded frames such as a frame occurring before the current frame or a frame occurring after the current frame.

The block motion decision unit 134 generates a global motion vector ($V_{GM}$) for each a×a image block as follows:

$$\underline{v}(x,y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $\underline{r}^0$, $\underline{r}^x$, $\underline{r}^y$, and $\underline{r}^{xy}$ are defined as the following:

$\underline{r}^0 = \underline{v}^{00}$ $\underline{r}^x = \underline{v}^{H0} - \underline{v}^{00}$ $\underline{r}^y = \underline{v}^{0V} - \underline{v}^{00}$ $\underline{r}^{xy} = \underline{v}^{00} - \underline{v}^{H0} - \underline{v}^{0V} + \underline{v}^{HV}$; and, where $\underline{v}^{00}$, $\underline{v}^{H0}$, $\underline{v}^{0V}$, and $\underline{v}^{HV}$ represent the motion vectors of four a×a image blocks, at the four corners of the current frame having a size of H×V.

Figure 2:
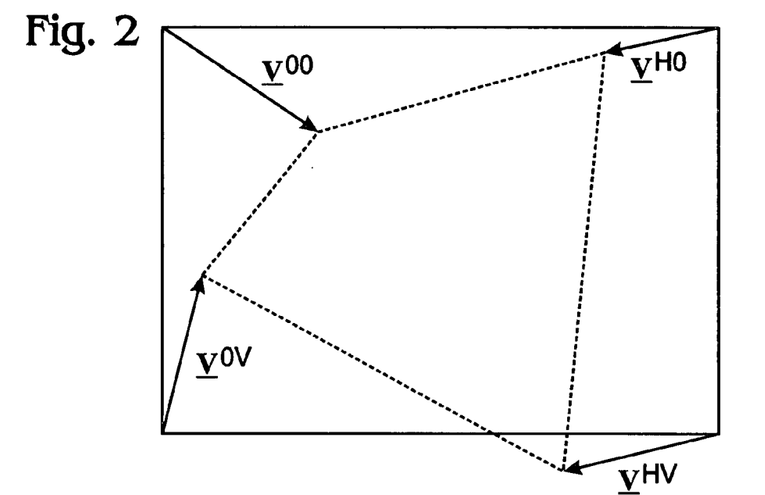
FIG. 2 is a graphical depiction of the above-described global motion vectors.

FIG. 2 is a graphical depiction of the above-described global motion vectors.

Figure 3:
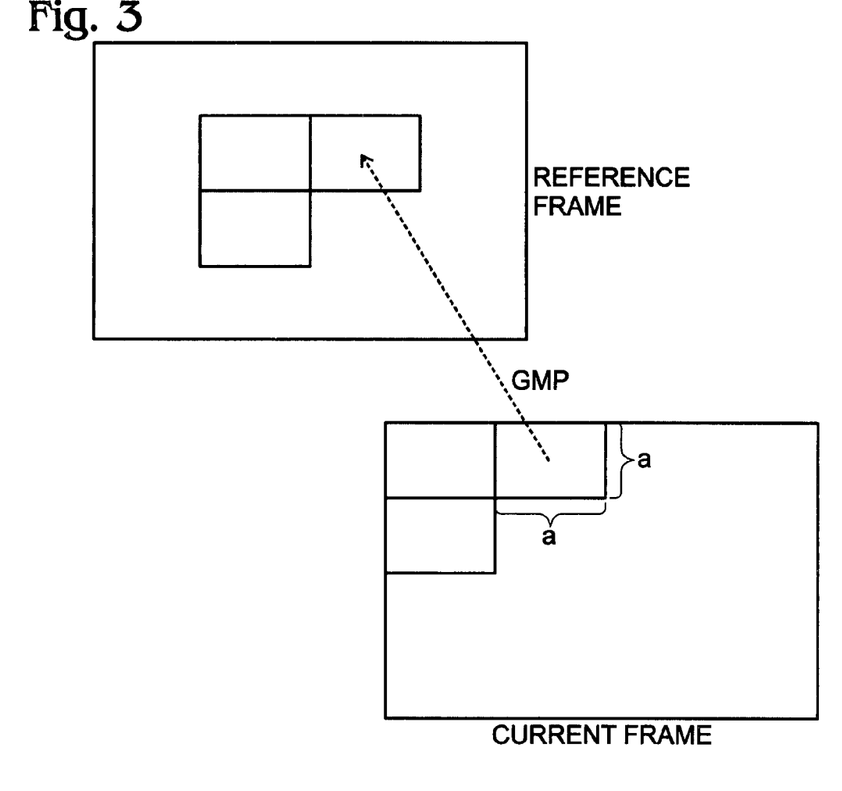
FIG. 3 is a graphical depiction of the GMPs being generated for a×a image blocks in the current frame.

FIG. 3 is a graphical depiction of the GMPs being generated for a×a image blocks in the current frame. In some aspects of the system, the block motion decision unit generates GMPs for 16×16 pixel image blocks (a=16). However, the present invention is not limited to any particular image block size.

Returning to FIG. 1, the block motion decision unit 134 generally supplies motion prediction blocks in response to using previously encoded information from a source such as temporarily distant reference frames and/or other image blocks in the current frame. In some aspects, the block motion decision unit 134 derives the GMPs from a $V_{GM}$ calculated for the corresponding image block in a previously encoded P frame.

In some aspects, the GMPE 126 generates a set of global motion parameters using a first reference frame having a temporal difference ($T_B$) from the current frame. Then, the block motion decision unit 134 scales GMPs in response to the temporal difference between the first reference frame and the current frame. More specifically, the block motion decision unit 134 generates a global motion vector ($V_{GM}$) with respect to a second reference frame, having a temporal difference $T_A$ from the current frame, and scales GMPs as follows:

$$GMP = V_{GM} \cdot (T_B/T_A).$$

As a B frame motion estimation alternative, the GMPE 126 generates global motion parameters between a previously encoded P frame and a first reference frame having a temporal difference $T_A$. Then, the block motion decision unit 134 generates GMPs for image blocks in the current frame by generating a global motion vector ($V_{GM}$), and scaling the $V_{GM}$ with respect to a second reference frame, having a temporal difference $T_B$ from the current frame as follows:

$$GMP = V_{GM} \cdot (T_B/T_A).$$

In other aspects, the block motion decision unit 134 generates GMPs for image blocks in a B frame, and scales GMPs in response to a first reference frame, when the first frame either occurs before the current frame, or after the current frame. That is, P frames need not be used to create global motion parameters when performing motion estimation for B frames.

In some aspects, the block motion decision unit 134 finds the GMPs for a first image block in the current frame, and uses the first image block GMPs to estimate motion for a second image block in the current frame.

When the current frame is a P frame, the local motion estimator 140 may generator an LMP from the group including LP1 through LP8 as follows:

LP1. A Motion Vector Prediction (MVP) as specified by the encoded video stream standard. This may be, for example, the MVP specified for use in H.264 video coding.

LP2. A zero motion vector.

LP3. A motion vector used by a previously tested block type in the current frame, where block type is understood to be the image block size, for example, an a×a block. The previously tested block in this case is at the same position (same x-y coordinates) as the block in the current frame. Further, the motion vector is temporally scaled. When the current block is a bottom field block, an additional motion vector can be used that is associated with a top field block in the same position.

LP4. A motion vector of the left neighboring block, scaled for the current reference picture.

LP5. A motion vector of the upper neighboring block, scaled for the current reference picture.

LP6. A motion vector of the same position in the previously encoded reference frame, temporally scaled for the current reference picture. Additional scaling is also performed if there are either frame or field mode differences between the current frame image block and the reference frame image block.

LP7. A motion vector of a right neighboring block in the previously encoded reference frame, temporally scaled, and scaled for field or frame mode differences.

LP8. A motion vector of a lower neighboring block in the previously encoded reference frame, temporally scaled, and scaled for field or frame mode differences.

Likewise, the local motion estimator 140 generates LMPs for a current B frame as follows:

LB1. A forward Motion Vector Prediction (MVP) relative to a first reference frame in a forward reference list, where a frame coding MVP is used for the frame mode, and either a same-parity or opposite-parity field coding MVP is used for the field mode.

LB2. A backward MVP relative to a first reference frame in a backward reference list, where a frame coding MVP is used for the frame mode, and either a same-parity or opposite-parity field coding MVP is used for the field mode.

LB3. A forward zero motion vector relative to the first reference frame in the forward reference list, where a frame coding MVP is used for the frame mode, and either a same-parity or opposite-parity field coding MVP is used for the field mode.

LB4. A backward zero motion vector relative to the first reference frame in the backward reference list, where a frame coding MVP is used for the frame mode, and either a same-parity or opposite-parity field coding MVP is used for the field mode.

LB5. A motion vector used by previously tested block type in the current frame, at the same position, either a backward or forward motion vector, where a frame coding MVP is used for the frame mode, and either a same-parity or opposite-parity field coding MVP is used for the field mode.

LB6. A motion vector of the left neighboring block, either a backward or forward motion vector.

LB7. A motion vector of the upper neighboring block, either a backward or forward motion vector.

LB8. A motion vector of the same position in the first reference frame in the forward reference list, scaled for field and frame mode differences.

LB9. A (temporally) scaled LB8 motion vector pointing to the first reference picture in the forward reference list.

LB10. A (temporally) scaled LB8 motion vector pointing to the first reference picture in the backward reference list.

LB11. A motion vector of the same position in the first reference frame in the backward reference list, scaled for field and frame mode differences.

LB12. A motion vector of the same position in the first reference frame in the backward reference list, scaled for field and frame mode differences, and further scaled to point to the first reference picture in the backward reference list.

From an analysis of the above-described LB LMPs, it can be seen that when the GMPE 126 generates a set of global motion parameters for a current B frame, the block motion decision unit 134 simultaneously selects a reference frame and a local motion predictor type.

Functional Description

The global motion estimation method is fully described in METHOD AND APPARATUS FOR GLOBAL MOTION ESTIMATION, invented by Shijun Sun, Ser. No. 10/094,043, filed Mar. 8, 2002, which is incorporated herein by reference. The present invention extends the use of global motion parameters for use in motion estimation, as applied to video encoding. In one aspect of this invention, computational complexity is reduced by assuming that all the pixels within a macroblock (16×16 pixels) share a same global motion vector. However, the invention is applicable to any size of macroblock. After deriving global motion parameters, only one global motion vector need be derived for each macroblock within the current video frame. The derived global motion vector can be used for the predictive motion estimation for all possible block modes or types.

The present invention further describes a process of using both local motion predictors and the GMPs for P frame and B frame motion estimation. Although local motion predictors are used in conventional algorithms, their use in combination with GMPs is novel.

Local Motion Predictor for P Frame Motion Estimation

The LP1 through LP8 list of local motion predictors, used for P frame motion estimation, has been described above. The local motion estimator checks through the list for each possible reference picture. A best candidate is chosen for each reference picture and a motion refinement is launched around the candidate predictor. The final motion vector (the motion prediction block) is derived by running through the same process, for each possible reference picture. Note: when computational power is limited, the local motion estimator may only check a subset of the local predictors.

GMP for P Frame Motion Estimation

The global motion parameters are explicitly derived for each P frame, relative to a previously encoded reference video frame. A global motion vector $V_{GM}$ is calculated for each macroblock. In cases of coding in interlace or field mode, the vertical component of $V_{GM}$ is further scaled to one half before application to the GMP. When the same reference frame that is used for global motion estimation (the first reference frame) is considered during the generation of the motion prediction block, the global motion vector $V_{GM}$ is used directly as the GMP for corresponding macroblocks in the first reference and current frames.

In cases where multiple reference pictures are used (first and second reference frames), the global motion vector is scaled according to the temporal distances between the current picture and the reference pictures. For example, if the temporal distance between the current frame and the previously encoded (first) reference frame (i.e., the one used for global motion estimation) is $T_A$, and the temporal distance between the current picture and the (second) reference picture being searched by the block motion decision unit is $T_B$, then the GMP is ($V_{GM}*T_B/T_A$).

Local Motion Predictor for B Frame Motion Estimation

The LB1 through LB12 list of local motion predictors, used for B frame motion estimation, has been described above. For each of the backward and forward directions, the local motion estimator searches through the list to select the best candidate motion predictor using a best candidate reference pictures. The final refinement is done only within the selected reference picture around the best candidate. It should be noted that the local motion estimator simultaneous considers both the reference picture selection and local motion predictor. Again, if computational power is limited, the local motion estimator may only check a subset of the local predictors.

GMP for B Frame Motion Estimation

To reduce computational complexity, the GMP for a B macroblock may be derived from the global motion vector calculated for the corresponding location in the previously encoded P frame. As with the P frame coding, in cases of coding in interlace or field mode, the vertical component of $V_{GM}$ is scaled to one half and then applied to the GMP. The GMPs are considered for the first reference frame in a backward reference list, as well as the first reference frame in a forward reference list. For field coding, predictions for both the same-parity fields and the opposite-parity fields are considered.

Similar to P frame motion estimation, the global motion vectors are scaled on the temporal distances between corresponding pictures and the prediction direction (either forward or backward). For example, if the temporal distance between the previously encoded P frame and the reference frame used for that global motion estimation is $T_A$, and the temporal distance between the current picture and the reference picture being searched by the motion estimation module is $T_B$, then the GMP is ($V_{GM}*T_B/T_A$). Note that $T_B$ and $T_A$ here could have different signs or directions for B frame motion prediction. Alternately, as described in detail above, the global motion parameters and resultant $T_B$ value, can be derived from a current B frame and a first reference frame.

Experimental Results

Experiments were conducted to test the performance of the present invention GMP motion estimation method. That is, an H.264 video encoder was tested using the present invention predictive motion estimation method, where both local motion predictors and the GMP were implemented. When the GMP option is enabled, the GMP is considered as an additional predictor when the position has not been covered by the local motion predictors. That is, if the GMP position or vector is the same as one of the LMP positions, that position need not be rechecked when the local motion predictors are calculated.

Figure 4A:
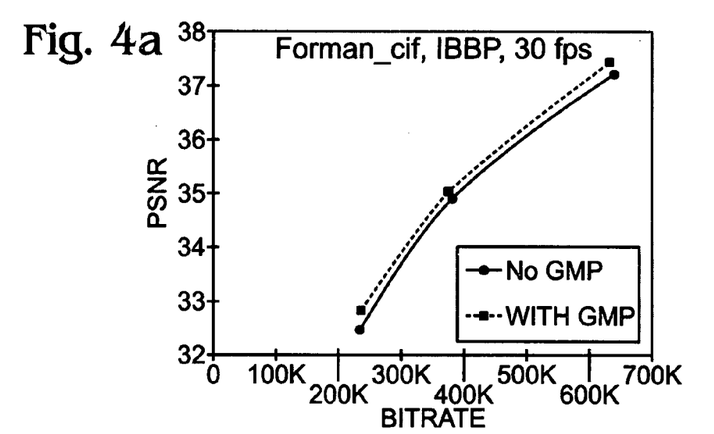
FIGS. 4a through 4c illustrate RD curves comparing encoding performance with, and without motion estimation using GMP.
Figure 4B:
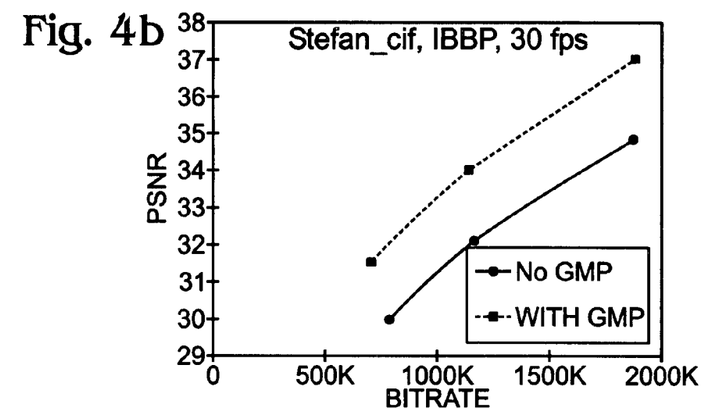
Figure 4C:
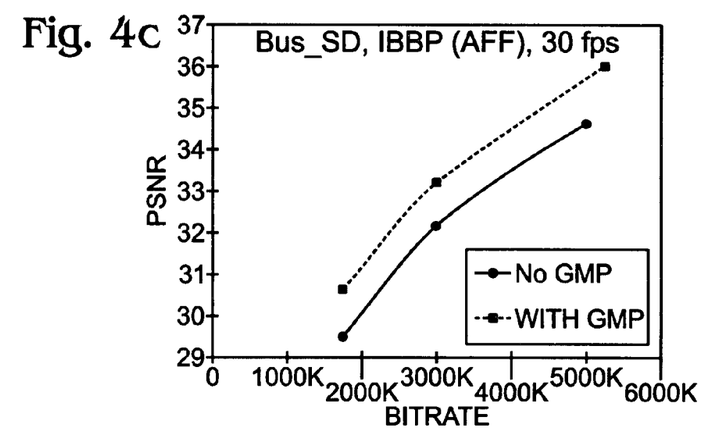

FIGS. 4a through 4c illustrate RD curves comparing encoding performance with, and without motion estimation using GMP. Here, "R" stands for the rate or bitrate associated with the x axis, and "D" stands for the distortion or the peak signal-to-noise ration (PSNR) associated with the y axis. For sequence without many fast camera motions (FIG. 4a; Foreman), the encoding results of using GMP are very close to results obtained without GMP. For sequences with very fast camera motions (FIG. 4b; Stefan and FIG. 4c; Bus), the improvement by GMP is very significant, roughly 1 dB for "Bus" and more than 2 dB's for "Stefan". The performance gain is consistent for both progressive (Stefan) and interlaced (Bus) data.

Although only H.264 encoder results are shown, the present invention method is applicable to any video encoding system using conventional video standards. The overhead of GMP is very small. Less than 2% of the total computation cycles in the H.264 encoder were devoted to the GMP process.

Figure 5:
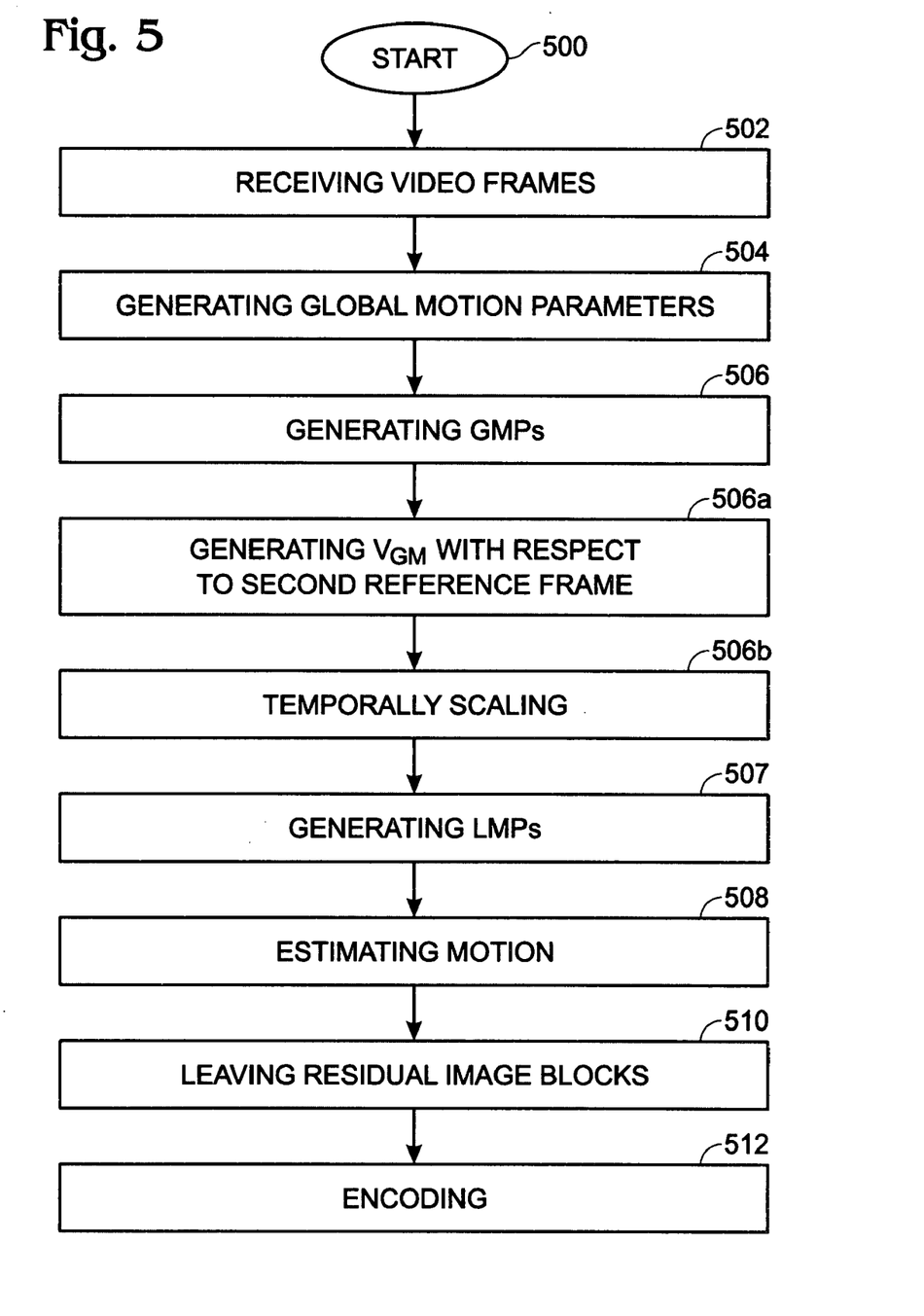
FIG. 5 is a flowchart illustrating the present invention method for using global motion predictors in predictive motion estimation for the compression of video.

FIG. 5 is a flowchart illustrating the present invention method for using global motion predictors in predictive motion estimation for the compression of video. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 receives video frames. Step 504 generates a set of global motion parameters for a current frame of video. Step 506, in response to the global motion parameters, generates GMPs for image blocks in the current frame. Step 508 estimates motion between the current frame and a reference frame. In the parlance of the FIG. 1 explanation, Step 508 supplies motion prediction blocks. Step 510 subtracts reference blocks in the reference frame from image blocks in the current frame, leaving residual image blocks. Step 512 encodes the residual image blocks in a video stream.

In some aspects of the method, generating GMPs in Step 506 includes generating a global motion vector ($V_{GM}$) for each a×a image block as follows:

$$\underline{v}(x, y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $\underline{r}^0$, $\underline{r}^x$, $\underline{r}^y$, and $\underline{r}^{xy}$ are defined as the following:

$\underline{r}^0 = \underline{v}^{00}$ $\underline{r}^x = \underline{v}^{H0} - \underline{v}^{00}$ $\underline{r}^y = \underline{v}^{0V} - \underline{v}^{00}$ $\underline{r}^{xy} = \underline{v}^{00} - \underline{v}^{H0} - \underline{v}^{0V} + \underline{v}^{HV}$; and, where $\underline{v}^{00}$, $\underline{v}^{H0}$, $\underline{v}^{0V}$, and $\underline{v}^{HV}$ represent the motion vectors of four a×a image blocks, at the four corners of the current frame having a size of H×V. In some aspects, GMPs are generated for 16×16 pixel image blocks. However, the invention is not limited to any particular block size.

Some aspects include a further step, Step 507, of generating local motion predictors (LMPs). Then, estimating motion between the current frame and a reference frame (Step 508) includes estimating motion using the GMPs and the LMPs.

In one aspect, generating a set of global motion parameters for a current video frame in Step 504 includes generating a set of global motion parameters for a current predictive (P) frame, considered with respect to a previously encoded frame. In another aspect, Step 504 generates a set of global motion parameters for a current bidirectional (B) frame, considered with respect to previous encoded frames occurring either before the current frame, or after the current frame. In one aspect, Step 504 derives the GMPs from a V$_{GM}$ calculated for the corresponding image block in a previously encoded P frame.

In other aspects, estimating motion in Step 508 includes using previously encoded information from a source such as temporarily distant reference frames and/or other image blocks in the current frame. For example, if generating a set of global motion parameters (Step 504) includes generating global motion parameters between the current frame and a first reference frame. Then, estimating motion between the current frame and a reference frame in Step 508 includes scaling GMPs in response to the temporal difference between a first reference and the current frame.

More specifically, if Step 504 generates global motion parameters between the current frame and a first reference frame having a temporal difference of T$_B$, then Step 506 includes substeps. Step 506a generates a global motion vector (V$_{GM}$) with respect to a second reference frame, having a temporal difference T$_A$ from the current frame. Step 506b scales the GMPs as follows:

$$GMP = V_{GM} \cdot (T_B/T_A).$$

As a B frame motion estimation alternate, Step 504 generates global motion parameters between a previously encoded P frame and a first reference frame having a temporal difference T$_A$. Then, Step 506 generates a global motion vector (V$_{GM}$), scaled with respect to a second reference frame, having a temporal difference T$_B$ from the current frame as follows:

$$GMP = V_{GM} \cdot (T_B/T_A).$$

In another aspect, when Step 504 generates GMPs for image blocks in a B frame, then Step 506b scales the GMPs in response to a first reference frame that may occurring either before, or after the current frame.

Step 508 may also use previously encoded information from other image blocks in the current as follows: by finding the GMPs for a first image block in the current frame; or, by using the first image block GMPs to estimate motion for a second image block in the current frame.

Step 507 generates LP1 through LP8 LMPs for a current P frame. Details of the P frame LMPs (LP1 through LP8) are provided above. Likewise, Step 507 generates LMPs LB1 through LB12 for a current B frame. The details of the LB type LMPs have been provided above. When Step 504 generates a set of global motion parameters for a current B frame, then generating GMPs in Step 506 includes simultaneously selecting a reference frame and a local motion predictor type.

A system and method have been providing for using global motion predictors in the motion estimations needed to compress video frames into a video stream. Examples have been given, to illustrate the invention, of particular temporal scaling schemes and of particular local motion predictors. However, the invention is not limited to any of these examples. Other variations and embodiments of the invention will occur to those skilled in the art.

I claim:

1. A method for using global motion predictors (GMPs) in predictive motion estimation for the compression of video, the method comprising:
   receiving video frames;
   generating a set of global motion parameters for a current frame of video;
   in response to the global motion parameters, generating GMPs for image blocks in the current frame;
   generating local motion predictors (LMPs);
   estimating motion between the current frame and a reference frame, using the GMPs and LMPs;
   subtracting reference blocks in the reference frame from image blocks in the current frame, leaving residual image blocks; and,
   encoding the residual image blocks in a video stream.

2. The method of claim 1 wherein generating GMPs for image blocks in the current frame includes generating a global motion vector (V$_{GM}$) for each a×a image block as follows:

$$\underline{v}(x, y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $\underline{r}^0$, $\underline{r}^x$, $\underline{r}^y$, and $\underline{r}^{xy}$ are defined as the following:

$\underline{r}^0 = \underline{v}^{00}$ $\underline{r}^x = \underline{v}^{H0} - \underline{v}^{00}$ $\underline{r}^y = \underline{v}^{0V} - \underline{v}^{00}$ $\underline{r}^{xy} = \underline{v}^{00} - \underline{v}^{H0} - \underline{v}^{0V} + \underline{v}^{HV}$; and, where $\underline{v}^{00}$, $\underline{v}^{H0}$, $\underline{v}^{0V}$, and $\underline{v}^{HV}$ represent the motion vectors of four a×a image blocks, at the four corners of the current frame having a size of H×V.

3. The method of claim 2 wherein generating GMPs for image blocks in the current frame includes generating GMPs for 16×16 pixel image.

4. The method of claim 1 wherein estimating motion between the current frame and a reference frame includes using previously encoded information from a source selected from the group including temporarily distant reference frames and other image blocks in the current frame.

5. The method of claim 1 wherein generating a set of global motion parameters for a current video frame includes generating a set of global motion parameters for a current predictive (P) frame, considered with respect to a previously encoded frame.

6. The method of claim 1 wherein generating a set of global motion parameters for a current video frame includes generating a set of global motion parameters for a current bidirectional (B) frame, considered with respect to previous encoded frames selected from a group including frames occurring before the current frame and frames occurring after the current frame.

7. The method of claim 6 wherein generating GMPs for image blocks in the current B frame includes deriving the GMPs from a $V_{GM}$ calculated for the corresponding image block in a previously encoded P frame.

8. The method of claim 1 wherein generating a set of global motion parameters for a current frame of video includes generating global motion parameters between the current frame and a first reference frame;
   wherein generating GMPs for image blocks in the current frame includes scaling GMPs in response to the temporal difference between a first reference and the current frame.

9. The method of claim 8 wherein generating global motion parameters includes generating global motion parameters between the current frame and a first reference frame having a temporal difference $T_B$;
   wherein generating GMPs for image blocks in the current frame includes:
      generating a global motion vector ($V_{GM}$) with respect to a second reference frame, having a temporal difference $T_A$ from the current frame; and,
      scaling the GMPs as follows:

$GMP = V_{GM} \cdot (T_B/T_A)$.

10. The method of claim 8 wherein generating GMPs for image blocks in the current frame includes generating GMPs for image blocks in a B frame; and,
   wherein scaling GMPs in response to the temporal difference between the first reference and current frames includes scaling the GMPs in response to a first reference frame selected from the group including a frame occurring before the current frame and a frame occurring after the current frame.

11. The method of claim 4 wherein using previously encoded information from other image blocks in the current frame includes:
   finding the GMPs for a first image block in the current frame; and,
   using the first image block GMPs to estimate motion for a second image block in the current frame.

12. The method of claim 1 wherein generating LMPs includes generating LMPs for a current P frame as follows:
   a Motion Vector Prediction (MVP) as specified by the encoded video stream standard (LP 1);
   a zero motion vector (LP2);
   a motion vector used by a previously tested block type in the current frame, at the same position, temporally scaled, and when the current block is a bottom field block, an additional motion vector used by a top field block in the same position (LP3);
   a motion vector of the left neighboring block, scaled for the current reference picture (LP4);
   a motion vector of the upper neighboring block, scaled for the current reference picture (LP5);
   a motion vector of the same position in the previously encoded reference frame, temporally scaled for the current reference picture, and scaled for differences in mode selected from the group including field and frame modes (LP6);
   a motion vector of a right neighboring block in the previously encoded reference frame, temporally scaled, and scaled for differences selected from the group including field and frame modes (LP7); and,
   a motion vector of a lower neighboring block in the previously encoded reference frame, temporally scaled, and scaled for differences selected from the group including field and frame modes (LP8).

13. The method of claim 1 wherein generating LMPs includes generating LMPs for a current B frame as follows:
   a forward Motion Vector Prediction (MVP) relative to a first reference frame in a forward reference list, selected from a group including a frame coding MVP, a same-parity field coding MYP, and an opposite-parity field coding MVP (LB1);
   a backward MVP relative to a first reference frame in a backward reference list, selected from the group including a frame coding MVP, a same-parity field coding MVP, and an opposite-parity field coding MVP (LB2);
   a forward zero motion vector relative to the first reference frame in the forward reference list, selected from the group including a frame coding MVP, a same-parity field coding MVP, and an opposite-parity field coding MVP (LB3);
   a backward zero motion vector relative to the first reference frame in the backward reference list, selected from the group including a frame coding MVP, a same-parity field coding MVP, and an opposite-parity field coding MVP (LB4);
   a motion vector used by previously tested block type in the current frame, at the same position, selected from the group including backward and forward motion vectors, the motion vector selected from the group including a frame coding MVP, a same-parity field coding MVP, and an opposite-parity field coding MVP (LB5);
   a motion vector of the left neighboring block, selected from the group including backward and forward motion vectors (LB6);
   a motion vector of the upper neighboring block, selected from the group including backward and forward motion vectors (LB7);
   a motion vector of the same position in the first reference frame in the forward reference list, scaled for differences in mode selected from the group including field and frame modes (LB8);
   a scaled LB8 motion vector pointing to the first reference picture in the forward reference list (LB9);
   a scaled LB8 motion vector pointing to the first reference picture in the backward reference list (LB10);
   a motion vector of the same position in the first reference frame in the backward reference list, scaled for differences in mode selected from the group including field and frame modes (LB11); and,
   a motion vector of the same position in the first reference frame in the backward reference list, scaled for differences in mode selected from the group including field and frame modes, and further scaled to point to the first reference picture in the backward reference list (LB12).

14. The method of claim 7 wherein generating global motion parameters includes generating global motion parameters between a previously encoded P frame and a first reference frame having a temporal difference $T_A$;
   wherein generating GMPs for image blocks in the current frame includes generating a global motion vector ($V_{GM}$), scaled with respect to a second reference frame, having a temporal difference $T_B$ from the current frame as follows:

$GMP = V_{GM} \cdot (T_B/T_A)$.

15. The method of claim 1 wherein generating a set of global motion parameters for a current video frame includes generating a set of global motion parameters for a current B frame;

wherein estimation motion includes simultaneously selecting a reference frame and a local motion predictor type.

16. A system for using global motion predictors (GMPs) in predictive motion estimation for the compression of video, the system comprising:
   a variable length coder (VLC) having an interface to receive transformed video frame residuals and an interface to supply an encoded video stream;
   a global motion parameter estimator (GMPE) having an interface to accept a current video frame, an interface to accept a first reference frame, and an interface to supply global motion parameters calculated in response to comparing the current frame to the first reference frame;
   a block motion decision unit having an interface to receive the global motion parameters, the block motion decision unit calculating GMPs in response to comparing image blocks in the current frame to reference blocks in a second reference frame, and supplying motion prediction blocks at an interface; and,
   a summing circuit having an interface to accept the current frame, an interface to accept the motion prediction blocks, and an interface to supply residual image blocks for coding, as a result of subtracting the motion prediction blocks from image blocks in the current frame.

17. The system of claim 16 further comprising:
   a local motion estimator having an interface to accept the current frame and an interface to accept the second reference frame, and an interface to supply local motion predictions (LMPs) in response to comparing image blocks in the current frame and reference blocks in the second reference frame; and,
   wherein the block motion decision unit has an interface to accept the LMPs and supplies motion prediction blocks in response to the GMPs and the LMPs.

18. The system of claim 16 wherein the block motion decision unit generates a global motion vector ($V_{GM}$) for each a×a image block as follows:

$$\underline{v}(x,y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $\underline{r}^0$, $\underline{r}^x$, $\underline{r}^y$, and $\underline{r}^{xy}$ are defined as the following:

$\underline{r}^0 = \underline{v}^{00}$ $\underline{r}^x = \underline{v}^{H0} - \underline{v}^{00}$ $\underline{r}^y = \underline{v}^{0V} - \underline{v}^{00}$ $\underline{r}^{xy} = \underline{v}^{00} - \underline{v}^{H0} - \underline{v}^{0V} + \underline{v}^{HV}$; and, where $\underline{v}^{00}$, $\underline{v}^{H0}$, $\underline{v}^{0V}$, and $\underline{v}^{HV}$ represent the motion vectors of four a×a image blocks, at the four corners of the current frame having a size of H×V.

19. The system of claim 18 wherein the block motion decision unit generates GMPs for 16×16 pixel image blocks.

20. The system of claim 17 wherein the block motion decision unit supplies motion prediction blocks in response to using previously encoded information from a source selected from the group including temporarily distant reference frames and other image blocks in the current frame.

21. The system of claim 16 wherein the GMPE generates a set of global motion parameters for a current predictive (P) frame, considered with respect to a previously encoded frame.

22. The system of claim 16 wherein the GMPE generates a set of global motion parameters for a current bidirectional (B) frame, considered with respect to previous encoded frames selected from a group including frames occurring before the current frame and frames occurring after the current frame.

23. The system of claim 22 wherein the block motion decision unit derives the GMPs from a $V_{GM}$ calculated for the corresponding image block in a previously encoded P frame.

24. The system of claim 16 wherein the GMPE generates a set of global motion parameters using a first reference frame having a temporal difference ($T_B$) from the current frame; and,
   wherein the block motion decision unit scales GMPs in response to the temporal difference between the first reference frame and the current frame.

25. The system of claim 24 wherein the block motion decision unit generates a global motion vector ($V_{GM}$) with respect to a second reference frame, having a temporal difference $T_A$ from the current frame, and scales GMPs as follows:

$GMP = V_{GM} \cdot (T_B/T_A)$.

26. The system of claim 24 wherein the block motion decision unit generates GMPs for image blocks in a B frame, and scales GMPs in response to a first reference frame selected from the group including a frame occurring before the current frame and a frame occurring after the current frame.

27. The system of claim 20 wherein the block motion decision unit finds the GMPs for a first image block in the current frame, and uses the first image block GMPs to estimate motion for a second image block in the current frame.

28. The system of claim 20 wherein the local motion estimator generates LMPs for a current P frame as follows:
   a Motion Vector Prediction (MVP) as specified by the encoded video stream standard (LP1);
   a zero motion vector (LP2);
   a motion vector used by a previously tested block type in the current frame, at the same position, temporally scaled, and when the current block is a bottom field block, an additional motion vector used by a top field block in the same position (LP3);
   a motion vector of the left neighboring block, scaled for the current reference picture (LP4);
   a motion vector of the upper neighboring block, scaled for the current reference picture (LP5);
   a motion vector of the same position in the previously encoded reference frame, temporally scaled for the current reference picture, and scaled for differences in mode selected from the group including field and frame modes (LP6);
   a motion vector of a right neighboring block in the previously encoded reference frame, temporally scaled, and scaled for differences selected from the group including field and frame modes (LP7); and,
   a motion vector of a lower neighboring block in the previously encoded reference frame, temporally scaled, and scaled for differences selected from the group including field and frame modes (LP8).

29. The system of claim 20 wherein the local motion estimator generates LMPs for a current B frame as follows:
- a forward Motion Vector Prediction (MVP) relative to a first reference frame in a forward reference list, selected from a group including a frame coding MVP, a same-parity field coding MVP, and an opposite-parity field coding MVP (LB1);
- a backward MVP relative to a first reference frame in a backward reference list, selected from the group including a frame coding MVP, a same-parity field coding MVP, and an opposite-parity field coding MVP (LB2);
- a forward zero motion vector relative to the first reference frame in the forward reference list, selected from the group including a frame coding MVP, a same-parity field coding MVP, and an opposite-parity field coding MVP (LB3);
- a backward zero motion vector relative to the first reference frame in the backward reference list, selected from the group including a frame coding MVP, a same-parity field coding MVP, and an opposite-parity field coding MVP (LB4);
- a motion vector used by previously tested block type in the current frame, at the same position, selected from the group including backward and forward motion vectors, the motion vector selected from the group including a frame coding MVP, a same-parity field coding MVP, and an opposite-parity field coding MVP (LB5);
- a motion vector of the left neighboring block, selected from the group including backward and forward motion vectors (LB6);
- a motion vector of the upper neighboring block, selected from the group including backward and forward motion vectors (LB7);
- a motion vector of the same position in the first reference frame in the forward reference list, scaled for differences in mode selected from the group including field and frame modes (LB8);
- a scaled LB8 motion vector pointing to the first reference picture in the forward reference list (LB9);
- a scaled LB8 motion vector pointing to the first reference picture in the backward reference list (LB10);
- a motion vector of the same position in the first reference frame in the backward reference list, scaled for differences in mode selected from the group including field and frame modes (LB11); and,
- a motion vector of the same position in the first reference frame in the backward reference list, scaled for differences in mode selected from the group including field and frame modes, and further scaled to point to the first reference picture in the backward reference list (LB12).

30. The system of claim 16 wherein the GMPE generates a set of global motion parameters for a current B frame; and,
wherein the block motion decision unit simultaneously selects a reference frame and a local motion predictor type.

31. The system of claim 23 wherein the GMPE generates global motion parameters between a previously encoded P frame and a first reference frame having a temporal difference $T_A$; and,
wherein the block motion decision unit generating GMPs for image blocks in the current frame by generating a global motion vector ($V_{GM}$) scaled with respect to a second reference frame, having a temporal difference $T_B$ from the current frame as follows:

$GMP = V_{GM} \cdot (T_B/T_A).$

* * * * *